United States Patent [19]

ReuBoiu et al.

[11] 4,439,899

[45] Apr. 3, 1984

[54] CLAMPING APPARATUS

[75] Inventors: Rudolph ReuBoiu, 597 Calle Hidalgo, San Clemente, Calif. 92672; Kenneth L. Fiebelkorn, Monterey Park, Calif.

[73] Assignee: Rudolph ReuBoiu, San Clemente, Calif.

[21] Appl. No.: 320,422

[22] Filed: Nov. 12, 1981

[51] Int. Cl.³ .............................................. A44B 21/00
[52] U.S. Cl. ................................... 24/458; 248/74 R; 24/459
[58] Field of Search ................ 24/17 AP, 249 R, 257, 24/243 E; 248/74.8, 74.7, 219.2, 219.4, 249 LS, 257

[56] References Cited

U.S. PATENT DOCUMENTS

| | | | |
|---|---|---|---|
| 1,365,629 | 1/1921 | Lieb | 248/74 R |
| 1,434,312 | 10/1922 | Penney | 24/17 AP |
| 2,547,936 | 4/1951 | Downs, Jr. | 24/249 LS |
| 2,736,854 | 2/1956 | Will | 248/219.2 |
| 3,185,420 | 5/1965 | Stewart | 248/74 R |
| 3,403,430 | 10/1968 | Steinborn | 24/16 PB |
| 3,438,095 | 4/1969 | Evans | 24/16 PB |
| 3,463,428 | 8/1969 | Kindorf | 248/74.8 |
| 3,485,468 | 12/1969 | Schweitzier, Jr. | 24/252 R |
| 3,837,101 | 9/1974 | Young | 24/17 AP |

FOREIGN PATENT DOCUMENTS 1137610 10/1962 Fed. Rep. of Germany .... 248/74 R

*Primary Examiner*—Paul J. Hirsch
*Attorney, Agent, or Firm*—Boniard I. Brown

[57] ABSTRACT

A clamping apparatus includes a first member defining a slot aperture with a wider portion and a narrower portion, and a second member with an arcuate portion for extension about an object to be clamped between the members. The second member has an end portion defining a plurality of pairs of notches, the notches of each pair being defined in opposite side edges of the end portion and being adapted to engage in the slot aperture of the first member upon insertion and rotation thereof relative to the first member. Fastener means, preferably a threaded fastener, is adjustable in position relative to the first member to retain and space the second member portion from the first member a selected distance to clamp an object of particular size between the first and second members.

7 Claims, 5 Drawing Figures

CLAMPING APPARATUS

BACKGROUND OF THE INVENTION

The invention relates to clamping apparatus. While particularly adapted to clamping together the stakes and crossmembers of a trellis apparatus used by commercial farmers, it will be understood that the invention also has application to other structures.

Commercial grape farmers typically use a trellis structure which includes vertical stakes disposed in rows. Each stake has carried thereon a crossarm. The size of the stake will vary although there are three common sizes. The common sizes are 1¾", 2", and 2¼". Parallel wires extend between adjacent crossbars. Usually there are four parallel wires which are pulled tight to support grape vines which hang downwardly from the wires. The vines wind around the wires and are harvested ordinarily by mechanical apparatus. The mechanical apparatus typically straddles the wires on which the vines are disposed and the grapes are shaken or knocked off as opposed to being picked. The apparatus normally includes receptacles for receiving the grapes.

The crossarms are typically metal and the stakes or uprights are usually wood. The crossarms typically are provided with slots or metal tabs which serve to retain the wires.

A difficulty in mounting the crossarms to the stakes relates to the need for apparatus which will quickly secure the crossarm to the stake and which will be sufficiently secure so that the crossarm will not be vulnerable to loosening despite the action of the mechanical harvesting apparatus which shakes or knocks off the grapes.

It is an object of the invention to provide apparatus which is easy and fast to install.

It is another object of the invention to provide apparatus which is adjustable to accommodate stakes of varying sizes.

Another object of the invention is to provide apparatus which is simple and inexpensive to manufacture.

SUMMARY OF THE INVENTION

The foregoing objects, as well as other objects and advantages which will become apparent from the detailed description of the preferred embodiment, are attained in a clamping apparatus which includes a first member defining a slot-shaped aperture with an enlarged portion having a width substantially greater than that of the remaining portion, and a second engaging member for engaging cooperation with the first member, and configurated to extend about an object. The second member is enlongated and has at its first extremity an engaging surface which is generally planar and which is dimensioned for sliding engagement in said aperture. The engaging surface has at least one notch on the side thereof, and preferably at least one pair of opposed notches, the notches of a pair being disposed in opposed relationship on opposite sides of the engaging surface. The second member has a second extremity adapted for securement to the first member, as by defining an opening for cooperation with a fastener.

The enlarged aperture portion may have a peripheral contour which is either arcuate or triangular. With a triangularly shaped contour, the base of the aperture may be disposed in generally aligned relationship with a side of the aperture. In those forms wherein a triangular enlarged aperture portion is utilized, the aperture may have an apex remote from a side of the aperture. The triangular enlarged portion may have the general configuration of a right isosceles triangle. The aperture may further include a notch on one side, and the enlarged aperture portion may be on the other side of the aperture.

BRIEF DESCRIPTION OF THE ACCOMPANYING DRAWING

DESCRIPTION OF THE PREFERRED EMBODIMENT

Figure 1:
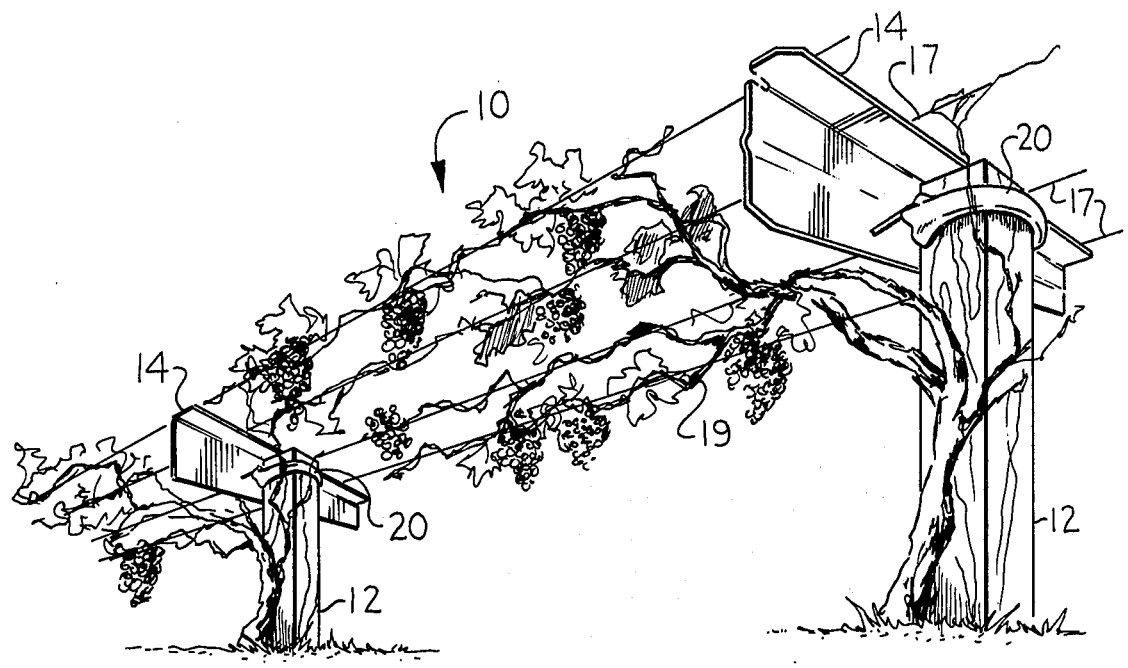
FIG. 1 is a perspective view of a trellis assembly which includes a stake or upright and crossbars secured together by a clamping apparatus in accordance with the invention, the crossbars carrying wires which support a grape vine.

Referring now to FIGS. 1-5, there is shown a trellis assembly 10 which includes a plurality of uprights or stakes 12 (two shown) disposed in a row. Disposed at the upper axial extremity of each upright 12 is a crossbar 14. Typically the upright 12 will be manufactured of wood. Commonly used sizes for such uprights 12 are 1¾", 2", and 2¼". The cross bar 14 typically will be metallic. As is most evident in FIGS. 2 and 3, the upright 12 ordinarily will have a rectangular cross-section and the top thereof will be square with respect to the axis of the upright 12. In other words, the top 12a will be planar and disposed in normal relationship to the axis of the upright 12. The lip 16 will ordinarily be disposed in abutting relationship with the top 12a of the upright 12. Another inside face 18 of the crossbar 14 abuts the side of the upright 12 to insure stable mounting of the crossbar 14 on the upright 12.

Figure 2:
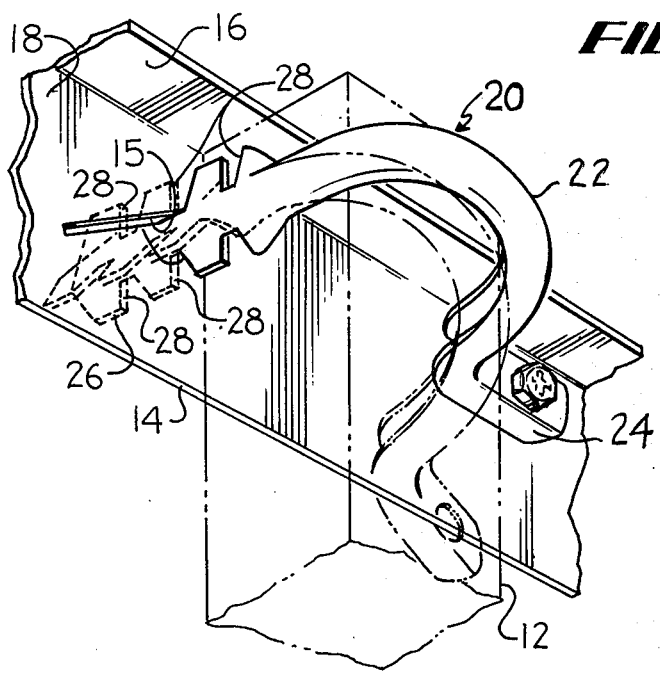
FIG. 2 is a partial perspective view illustrating the clamping apparatus of FIG. 1 in greater detail, and illustrating in phantom outline an initial positioning of the members during assembly.
Figure 4:
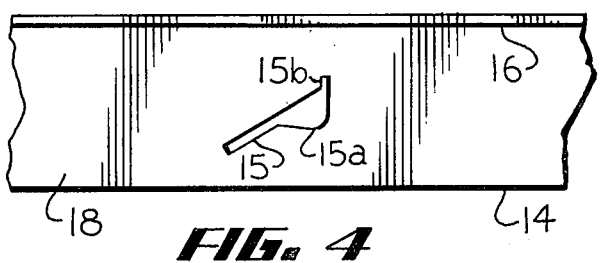
FIG. 4 is a partial elevational view of an alternative embodiment of the crossbar illustrated in FIG. 1.

The crossbars 14 carry wires 17 which in turn carry vines 19. The crossbar 14 has interior edge means defining an aperture 15. The aperture 15 has the contour of a slot except for one axial portion 15a. The axial portion 15a has a width which is much greater than the remainder of the slot. It is preferable that this portion 15a be V-shaped, as shown in FIG. 4, although the arcuate form shown in FIG. 2 is also desirable. As shown in FIG. 4 the portion 15a is a generally triangular portion. More specifically, the portion 15a is an isosceles triangle having the base thereof disposed in aligned relationship to the generally slot shape of the aperture 15. A notch 15b is disposed opposite to the portion 15a.

Figure 3:
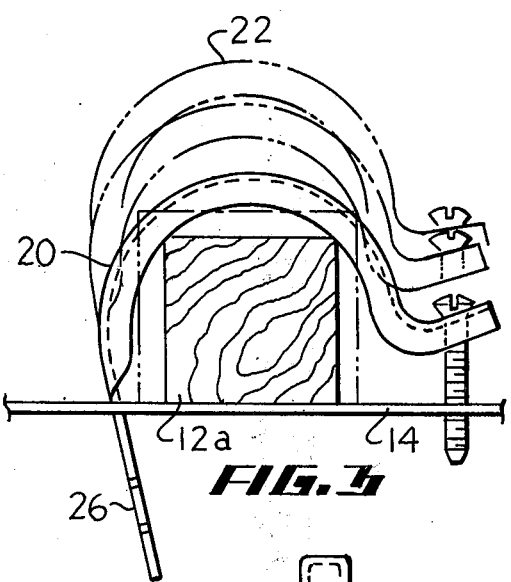
FIG. 3 is a partially sectional view, showing in phantom outline the adjustability of the clamping apparatus of FIG. 1 to accommodate different sizes of stakes or uprights with which the clamping apparatus is utilized.

The bracket assembly also includes a bracket 20. The bracket 20, in the preferred form, includes an arcuate midsection 22, a second end portion or foot 24 disposed at one extremity of the midsection, and a generally planar first engaging portion or surface 26. The engaging surface 26 is elongated and has notches 28. The engaging surface 26 is dimensioned for sliding engagement within the slot of the aperture 15 and is provided with notches 28 on each side thereof. The engaging surface 26 may, in various forms of the invention, have only one notch for cooperation with a side or sides of the aperture 15. In the preferred form of the invention, however, the engaging surface 26 is provided with oppositely disposed pairs of notches 28 which simultaneously engage the aperture 15. These notches 28 are generally V-shaped. Most advantageously, the engaging surface 26 is provided with three pairs of oppositely disposed V-shaped notches 28, so as to allow a greater range of adjustability than would otherwise be possible. This adjustability is best shown in FIG. 3 where phantom representations are shown of alternate positions of the engaging surface 26 with respect to the crossbar 14, thus to accommodate different sizes of stakes or uprights. It has been found that the notches 28 function most effectively if they are disposed so that each side of the V-shaped notch has an included angle with respect to the axis of the elongated engaging surface 26 which is ninety degrees or less.

Figure 5:
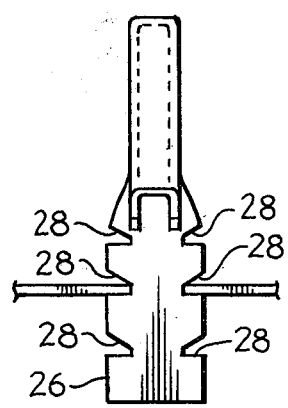
FIG. 5 is a partial elevational view illustrating the manner of cooperation between the elements of the clamping apparatus in accordance with the invention.

As shown in FIG. 5, a threaded fastener or bolt is threaded in an opening in the first member or cross-bar and in the engaging end portion of the bracket or second member for threading of the fastener to selected different distances as shown, to provide selected spacing between the first and second members to accommodate clamping of objects or stakes of different sizes between the members.

In operation, the user inserts the engagement surface 26 into the slot shaped portion of the aperture 15. He then rotates the bracket 20 (and the engagement surface 26) approximately 90 degrees to align a pair of notches 28, 28 with the sides of the aperture 15. The pair of notches 28, 28 is then engaged with the sides of the aperture 15. Preferably the notches 28 will engage the portion 15a and the notch 15b to insure positive locking. Thereafter a screw 30 is used to tightly secure the foot 24 to the crossbar 14. It will be understood that in various forms of the invention the midsection 22 may be arcuate. The term "arcuate" as used herein is intended to comprehend curvilinear surfaces and not be limited merely to surfaces which are sections of a circle.

In the preferred form illustrated in FIG. 4, the aperture 15 has three rectilinear sides. A second side is disposed with an included angle of 90 degrees with respect to a first side. Equivalent structures include sections of polygons including rectangles.

The invention has been described with reference to its illustrated preferred embodiment. Persons skilled in the art of constructing clamping apparatus may, upon exposure to the teachings herein, conceive variations in the mechanical development of the components therein. Such variations are deemed to be encompassed by the disclosure, the invention being delimited only by the appended claims.

The inventors claim:

1. Clamping apparatus comprising:
   a first member having edge means defining a slot aperture with an enlarged wider portion and a narrower portion, and
   a second member having a generally arcuate portion configured for extension about an object to be clamped between the first and second members,
   said second member having a first end portion defining a plurality of pairs of notches, the respective notches of each pair being defined in opposite side edges of the end portion and being sized and configured to engage said first member slot edge means upon insertion of the first end portion in the wider portion of said slot and rotation thereof relative to the first member to attach the second member first end portion to the first member, and
   fastener means adapted for adjustable securement on the second end portion of the second member, said fastener means being adjustable in position relative to the first member to retain and space the second member second end portion from the first member to a selected distance to clamp an object of particular size between the first and second members in cooperation with the engagement of a selected pair of said notches of a second end portion in the slot edge means of the first member.

2. The apparatus as described in claim 1, wherein: said wider portion of said slot aperture is generally triangular.

3. The apparatus as described in claim 2, wherein: the base of said generally triangluar shape is disposed in generally aligned relationship with a side of said slot aperture.

4. A clamping apparatus according to claim 2, wherein:
   said wider portion of the slot aperture has the general configuration of a right isosceles triangle with an apex remote from a side of the slot aperture.

5. Clamping apparatus according to claim 1, wherein:
   said second member second end portion extends generally outwardly from the arcuate portion,
   said first member has a threaded opening to receive the fastener means, and
   the fastener means is a threaded fastener sized and adapted for threaded engagement in the threaded opening of the first member and for extension through an opening in the second end portion of the second member, and has an enlarged head portion for retention in said second end portion opening, said threaded fastener being threadedly adjustable in position for selective spacing of its head portion relative to the first member.

6. Clamping apparatus according to claim 1, wherein: said first member is of rigid construction.

7. Clamping apparatus according to claim 1, wherein: the first member is a cross bar of a trellis, the object being clamped is a stake on which the cross bar is mounted, and the second member is a bracket configured to extend about stakes of different sizes.

* * * * *